Jan. 17, 1939.   C. A. WICKER   2,144,435
TANDEM WHEEL CONSTRUCTION FOR VEHICLES
Filed Oct. 13, 1937   2 Sheets-Sheet 2
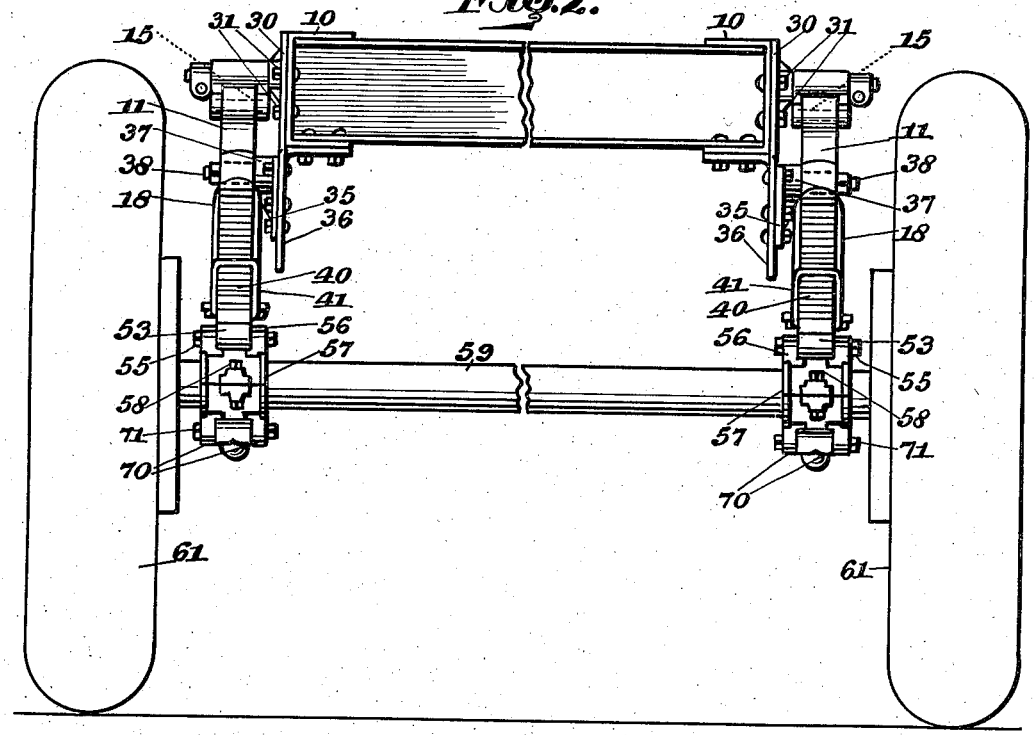
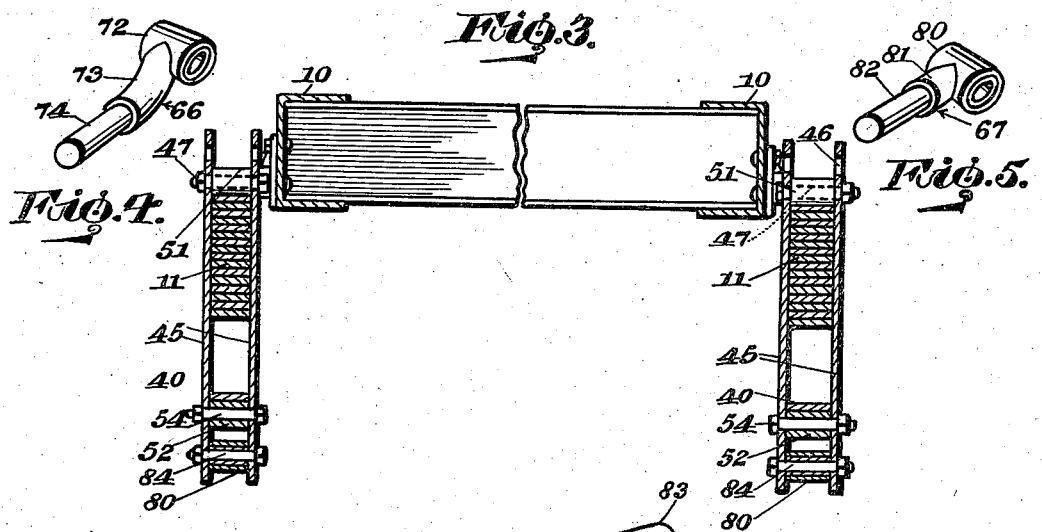
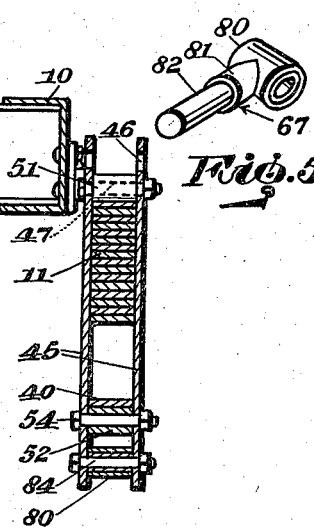
INVENTOR
Charles A. Wicker
Munn, Anderson & Liddy
ATTORNEY Patented Jan. 17, 1939

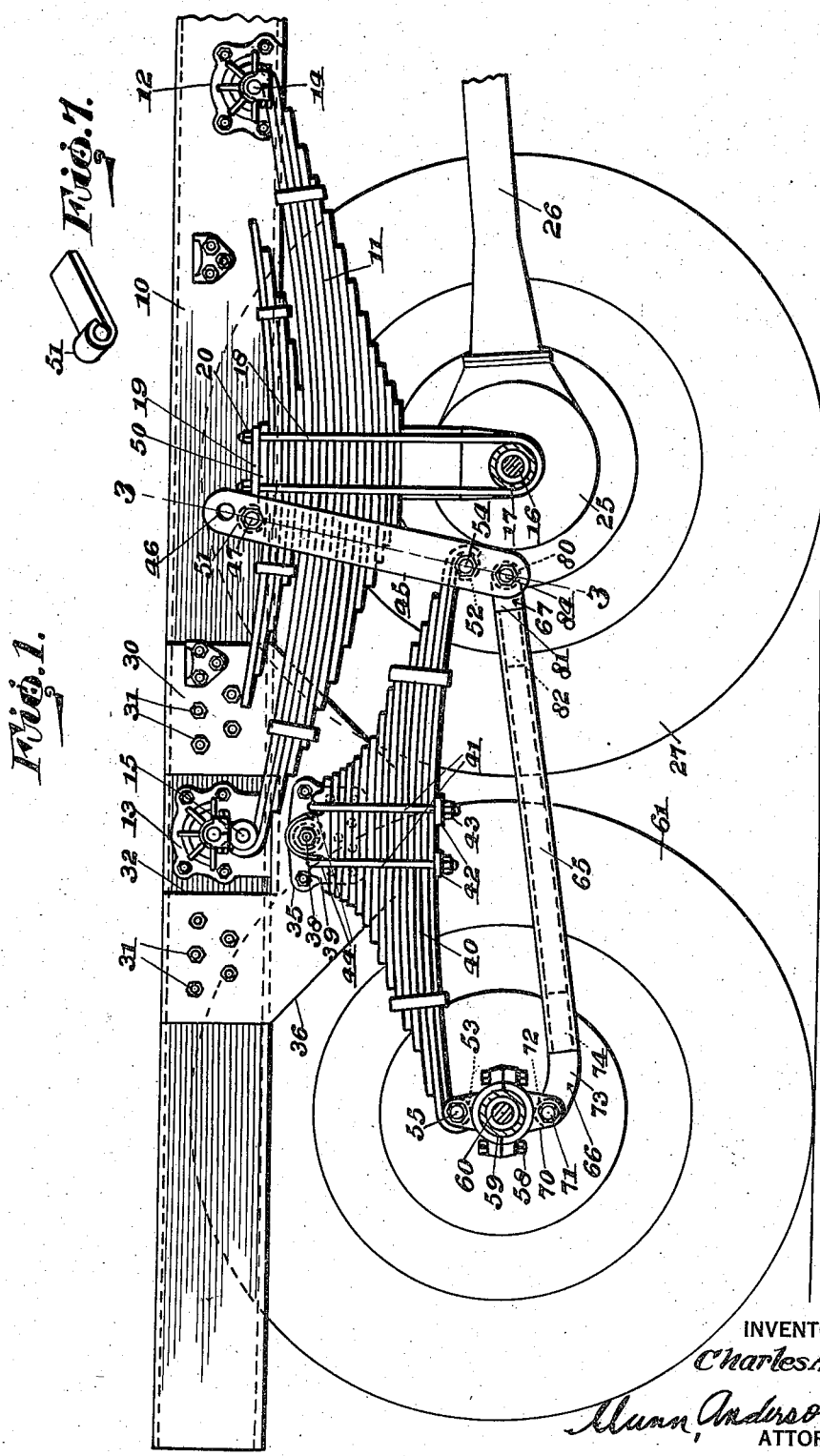

2,144,435

UNITED STATES PATENT OFFICE 2,144,435

TANDEM WHEEL CONSTRUCTION FOR VEHICLES

Charles A. Wicker, Selma, Ala.

Application October 13, 1937, Serial No. 168,827

6 Claims. (Cl. 280—104)

This invention relates to auxiliary wheel suspensions for vehicles.

An object of the invention is the provision of a third axle and spring suspensions therefor so that the load of the vehicle at the rear axle will be distributed between four wheels instead of two whereby an equalizing effect is had at the rear wheels and whereby 50% more load may be carried by the vehicle with a consequent saving on the tires.

Another object of the invention is the provision of an auxiliary wheel suspension for vehicles in which the load of the vehicle is distributed over four tires instead of two and in which a third axle supported by auxiliary wheels is flexibly mounted to relieve wear on the tires whereby a greater load may be carried by the extension of the truck body.

A further object of the invention is the provision of a third axle located adjacent the main rear axle which gives perfect equalizing action at the rear wheels, the device being installed without necessitating any changes or reinforcement to the chassis.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a vertical longitudinal section showing the auxiliary wheels located in cooperative relationship with the usual rear wheels of a truck, Figure 2 is a rear view in elevation of the chassis showing the auxiliary wheels in position, Figure 3 is a transverse vertical section taken along the line 3—3 of Figure 1, Figure 4 is a view in perspective of a member which forms part of the connection between the third axle and the spring suspension for the main rear axle, Figure 5 is a view in perspective of another member of the connection between the auxiliary axle and the spring suspension for the main rear axle, Figure 6 is a view in perspective of a tubular member which joins the members shown in Figs. 4 and 5, and Figure 7 is a view in perspective of a connecting plate for one end of the spring suspension of the auxiliary axle.

Referring more particularly to the drawings, 10 designates a beam of the chassis of a truck which is normally supported by a compound leaf spring 11. Brackets 12 and 13 are secured in spaced relation to the beam 10 and the ends of the leaf spring are supported on bolts 14 and 15 suspended respectively from the brackets 12 and 13.

The axle 16 is located within an axle housing 17. The spring 11 is clamped to the axle housing 17 by means of U-bolts 18 and a bridging plate 19. Nuts 20 secure the bolts in position with respect to the bridging plate 19.

A differential housing 25 contains the usual differential for driving the rear axles of which one designated by the numeral 16 is shown and a drive shaft housing 26 extends from the differential housing 25.

Rear wheels 27 are mounted on the rear axles and in this case aid in supporting the load at the rear of the truck.

All of the elements just described are standard equipment on vehicles of this type and form no part of the present invention.

A V-shaped plate 30 is secured at 31 to the beam 10 and has a cut-out portion, as shown at 32, to receive the bracket 13. Thus the plate 30 is located rearwardly of the standard axle housing 17.

A bracket 35 is secured in any approved manner to the pending portion 36 of the plate 30 at the outer face thereof and is provided with a bearing 37 which receives a bolt 38 upon which is mounted a hanger 39 for a compound leaf spring 40.

The hanger 39 is connected to the leaf spring 40 by means of U-bolts 41, perforated bars 42 and nuts 43. The hanger 39 is provided with notches 44 which receive the bight of the U-bolts 41.

A pair of straps 45 are provided with a plurality of perforations 46 at the upper ends thereof to receive a bolt 47. The plurality of perforations 46 permits the adjustment of the straps so that said straps may be raised or lowered when required.

A plate 50 is provided with a sleeve 51 at one end and this sleeve receives the bolt 47 whereby the straps 45 are suspended from said bolt. It will be noted that the plate 50 is clamped to the upper face of the compound leaf spring 11 by means of the U-bolts 18, the plate 19 and the nuts 20.

The opposite ends of the spring 40 are provided with sleeves 52 and 53. The sleeve 52 is adapted to receive a bolt 54 carried by the lower ends of the straps 45 while the sleeve 53 is adapted to receive a bolt 55 carried by bearings 56 projecting from the sections of a split ring, generally designated by the numeral 57. The split ring has its sections bolted together as shown at 58 on an auxiliary rear axle housing 59 in which is mounted an axle 60.

Wheels 61 are loosely mounted on the axle 60 and are free to revolve on this axle and are also supported in the usual manner by the axle housing 59. The wheels 27, however, are driven in the usual manner.

A hollow tube 65 together with members 66 and 67 form a yielding connection between the split ring 57 attached to the auxiliary axle housing 59 and the extreme lower end of the straps 45.

The lower portion of the split ring 57 is provided with bearings 70 which receive a bolt 71 and this bolt passes through a sleeve 72 at one end of the member 66. This member is provided with an arm 73 which has a reduced portion 74 and this reduced portion is received by the rear end 75 of the tube 65.

The member 67 is also provided with a sleeve 80 which has an arm 81 extending therefrom and a reduced portion 82. The reduced portion is received within the other end 83 of the tube 65. A bolt 84 is supported by the lower end of the straps 45 and is received by the sleeve 80, the sleeve being disposed between the lower ends of the straps 45.

It has been found that the standard tires are not capable of supporting the loads indicated by manufacturers because these tires wear out very rapidly or blow out whereby considerable expense is had in operating trucks along various types of roads. Furthermore, in order to distribute the load and to relieve the tires of the strain, additional wheels and tires have been employed in connection with the rear axle of the vehicle. Furthermore, auxiliary axles have been employed in connection with auxiliary wheels for aiding and supporting a load but due to the lack of flexibility in these two types of construction a great wear on the tires is not obviated.

In the present construction the load is not only evenly distributed on all the four rear tires, but the particular spring suspension for the auxiliary axle and supplementary wheels relieves the wear and tear on the tires and more equably distributes the load.

In the operation the auxiliary wheels 61 are connected not only to the channel beams 10 of the vehicle but they have a flexible connection with the main compound leaf spring 11 through the straps or shackles 45, particularly where the auxiliary spring 40 is partly supported by said shackles. These shackles while being permitted to swing are limited in their swinging movement by the flexible connection through the members 65, 66 and 67.

When the wheels 61 are raised by an obstruction or elevation in the roadbed the shock is not absorbed by the spring 40 but by the spring 11. One of the wheels 61 may be elevated without disturbing the position of the associated wheel. Rocking of the rear axle is also compensated for by the sliding of the reduced arms 74 and 82 within the respective ends 75 and 83 of the tubular member 65.

When the wheels 61 are raised the rear end of the springs 40 are likewise raised and the shackles 45 swing forwardly and since the springs 40 are supported at their ends by the springs 11 not only the resilience of the springs 40 comes into play but the springs 11 also operate to maintain the proper balance between the wheels 27 and 61. This is also true when the wheels 27 meet with an obstruction whereby said wheels are elevated and the reaction caused by the elevation of wheels 27 is imparted in a flexible manner to the rear wheels 61.

I claim:

1. A tandem wheel construction for vehicles comprising a vehicle frame, a leaf spring connected at its ends to the frame, a rear axle housing connected to the spring, an auxiliary axle housing spaced from the first axle housing, a shackle suspended from the spring, a second leaf spring having one end connected to the auxiliary axle housing and the other end connected to the lower end of the shackle, means connecting the intermediate portion of the auxiliary spring to the frame, and a yielding connection between the auxiliary housing and the lower end of the shackle.

2. A tandem wheel construction for vehicles comprising a vehicle frame, a leaf spring connected at its ends to the frame, a rear axle housing connected to the spring, an auxiliary axle housing spaced from the first axle housing, a shackle suspended from the spring, a second leaf spring having one end connected to the auxiliary axle housing and the other end connected to the lower end of the shackle, means connecting the intermediate portion of the auxiliary spring to the frame, and a yielding connection between the auxiliary housing and the lower end of the shackle, the attachments of the yielding connection with the shackle and auxiliary housing being downwardly of the connections between the auxiliary spring, the auxiliary housing and the shackle.

3. A tandem wheel construction for vehicles comprising a vehicle frame, a leaf spring connected at its ends to the frame, a rear axle housing connected to the spring, an auxiliary axle housing spaced from the first axle housing, a shackle suspended from the spring, a second leaf spring having one end connected to the auxiliary axle housing and the other end connected to the lower end of the shackle, means connecting the intermediate portion of the auxiliary spring to the frame, and a yielding connection between the auxiliary housing and the lower end of the shackle said connection including a tubular member, nipples slidably received by the ends of said member, one of said nipples being pivotally connected to the auxiliary housing, the other nipple being pivotally connected to the lower end of the shackle.

4. A tandem wheel construction for vehicles comprising a vehicle frame, a main axle housing, a main leaf spring connected at its ends to the frame and at an intermediate portion to the housing, an auxiliary axle housing spaced from the main housing, an auxiliary leaf spring supported intermediate its ends from the frame, a shackle swingably supported from an intermediate portion of the main spring, means connecting one end of the auxiliary spring to the lower end of the shackle, means connecting the other end of the auxiliary spring to the auxiliary housing, and means for loosely connecting the lower end of the shackle with the auxiliary housing.

5. In a rear wheel construction having a leaf spring connected at its ends to a vehicle frame, a shackle having one end swingably supported from an intermediate portion of said spring whereby movements of said spring will affect the relative positions of the shackle, an auxiliary axle housing located beyond said spring, an auxiliary leaf spring, means for suspending the auxiliary leaf spring from the frame, a yielding connection between the lower end of the shackle and the auxiliary housing, means pivotally connecting one end of the auxiliary spring with the shackle at a point between the ends of the shackle, means connecting the other end of the auxiliary spring with the auxiliary housing.

6. A tandem wheel construction for vehicles comprising a vehicle frame, a leaf spring connected at its ends to the frame, a rear axle housing connected to the spring, an auxiliary axle housing spaced from the first axle housing, a shackle suspended from the spring, a second leaf spring having one end connected to the auxiliary axle housing and the other end connected to the lower end of the shackle, means connecting the intermediate portion of the auxiliary spring to the frame, and a yielding connection between the auxiliary housing and the lower end of the shackle, the point of connection between the auxiliary spring and the frame being in vertical alinement with the connection of one end of the main spring with the frame.

CHARLES A. WICKER.